(No Model.) 2 Sheets—Sheet 1.
E. B. PORTER.
FISHING REEL.
No. 446,467. Patented Feb. 17, 1891.
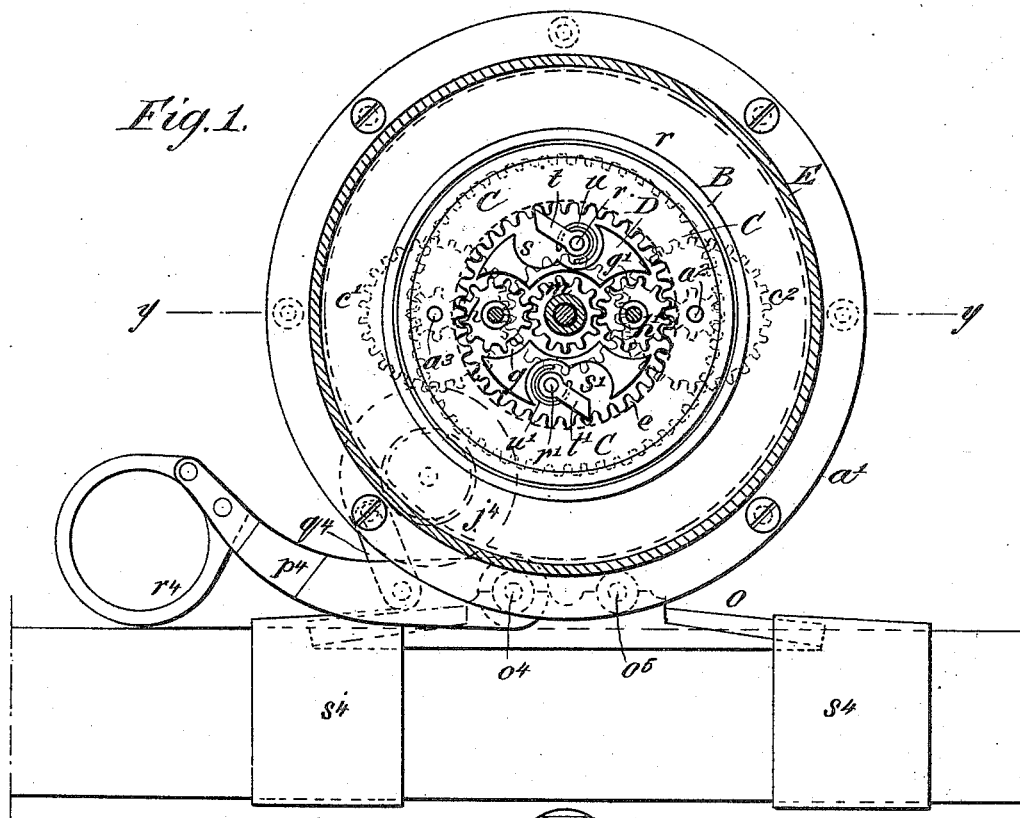
Fig. 1.
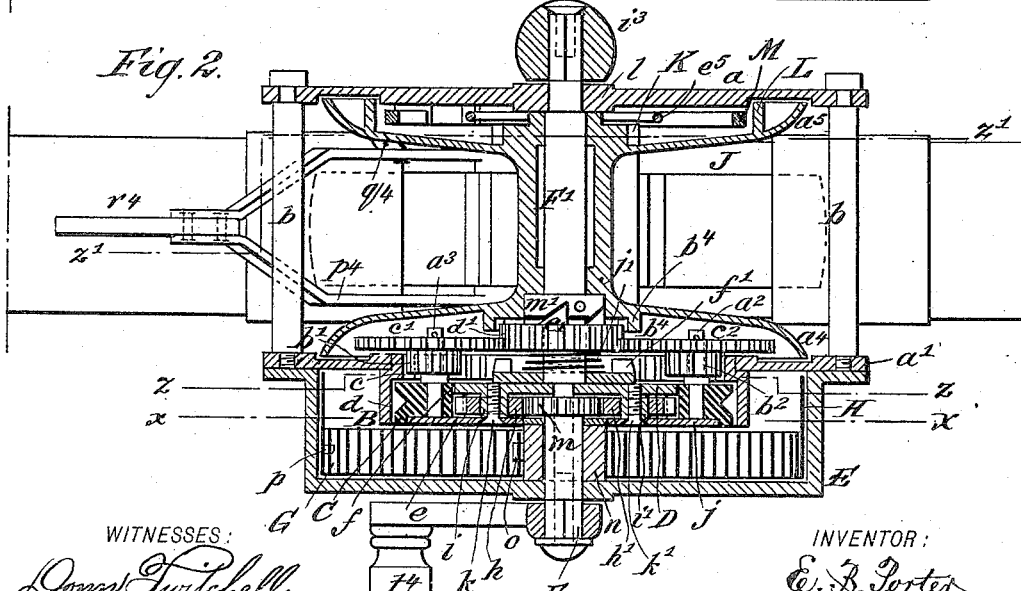
Fig. 2.
WITNESSES: 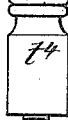
Donn Twitchell
C. Sedgwick
INVENTOR:
E. B. Porter
BY
Munn & Co.
ATTORNEYS.

(No Model.) 2 Sheets—Sheet 2.
E. B. PORTER.
FISHING REEL.
No. 446,467. Patented Feb. 17, 1891.
Fig. 3.
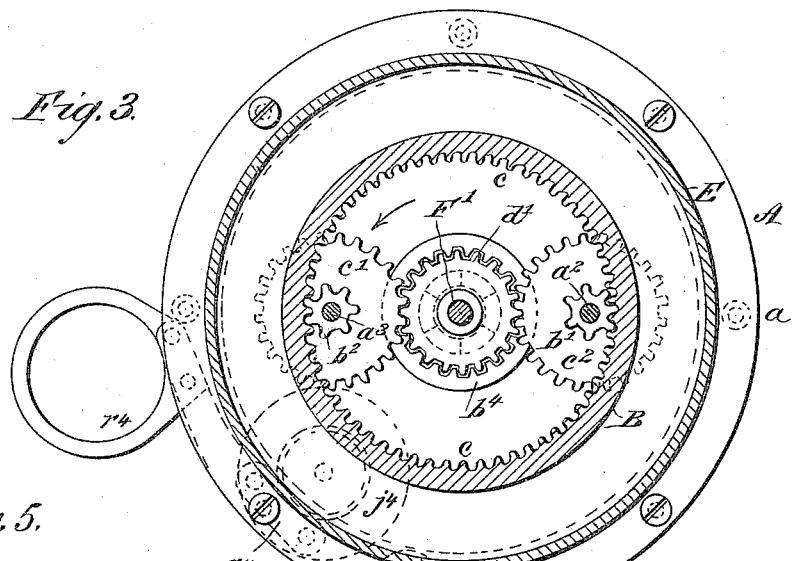
Fig. 5.
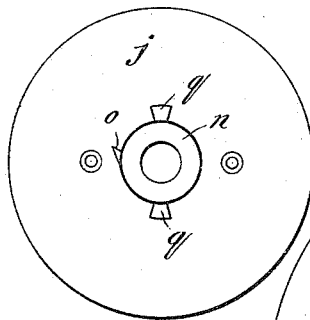
Fig. 6.
Fig. 4.
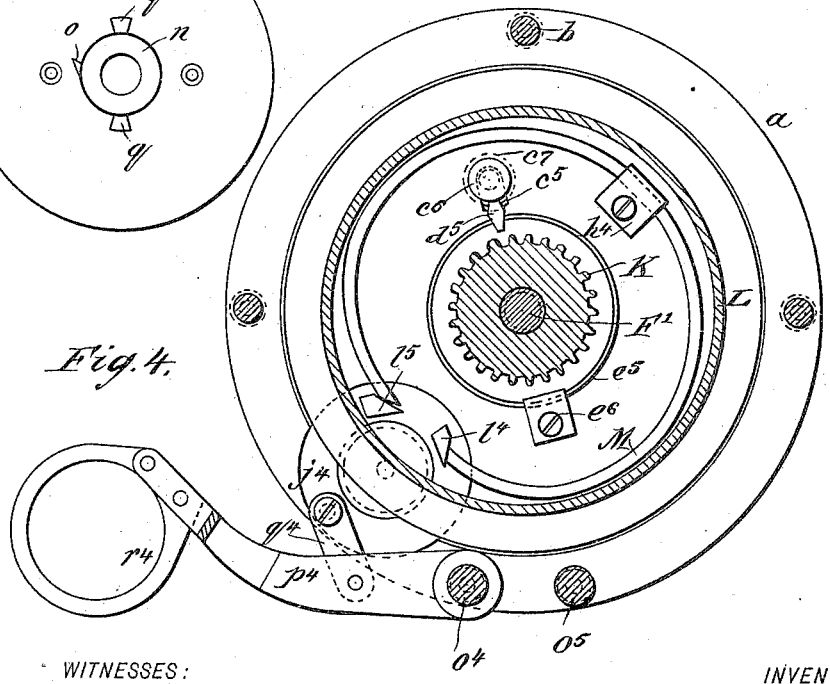
WITNESSES:
Donn Twitchell
C. Sedgwick
INVENTOR:
E. B. Porter
BY
Munn & Co
ATTORNEYS.

UNITED STATES PATENT OFFICE.

ELBERT B. PORTER, OF PENN YAN, NEW YORK.

FISHING-REEL.

SPECIFICATION forming part of Letters Patent No. 446,467, dated February 17, 1891.

Application filed March 13, 1890. Serial No. 343,697. (No model.)

*To all whom it may concern:*

Be it known that I, ELBERT B. PORTER, of Penn Yan, in the county of Yates and State of New York, have invented a new and Improved Fishing-Reel, of which the following is a specification, reference being had to the annexed drawings, forming a part thereof, in which—

Figure 1 is a side sectional elevation, the section being taken on line $xx$ in Fig. 2. Fig. 2 is a horizontal section taken on line $yy$ in Fig. 1. Fig. 3 is a vertical transverse section taken on line $zz$ in Fig. 2. Fig. 4 is a vertical transverse section taken on line $z'z'$ of Fig. 2. Fig. 5 is a detail view of the clutch-plate which connects the driving-spring with the gearing, and Fig. 6 is a side elevation of a portion of the clutch.

Similar letters of reference indicate corresponding parts in all the views.

The object of my invention is to provide a fishing-reel in which the line may be wound by a crank through the medium of a spring interposed between the gearing and the reel, or wound and used if the driving-spring becomes broken or detached from the hub or arbor, the whole being arranged so that the line may be paid out freely without resistance or with any desired amount of friction.

My object is further to provide means for giving an alarm when desired to notify the fisherman that the hook has been taken, and at the same time to prevent the reel from making an undue number of revolutions under a momentary impulse, if disconnected to pay out line.

My invention consists in the combination, with a driving-crank, a driving-spring, and a reel, of intermediate planetary gearing by means of which the turning of the reel and the winding of the spring may be carried on simultaneously.

The invention also consists in a brake of novel construction for retarding the motion of the reel and a drag for offering a slight resistance to the rotation of the reel and giving an alarm.

The invention also consists in mechanism for detaching the reel from the gearing, all as will be hereinafter more fully described.

The frame A of the reel is composed of the back plate $a$, the front plate $a'$, and the connecting-bars $b$.

In an aperture in the front plate $a'$ is fitted a ring B, which projects beyond the outer face of the plate $a'$ and is made in two diameters. The smaller diameter is provided with internal cogs $c$. The part $d$, which is larger in diameter, projects beyond the face of the plate $a'$ and receives the ring C. The ring C is provided with internal cogs $e$ and with a plain internal surface $f$, to which is fitted a recessed disk D. The said recessed disk D is provided upon diametrically-opposite sides of the axis of the disk with annular recesses $g\ g'$, to which are fitted the spur-wheels $h\ h'$. The said spur-wheels are arranged to revolve on the bosses $i\ i'$, and are held in place by the plate $j$, fitted to a recess in the outer face of the ring C and secured in place by screws $k\ k'$, fitting screw-threaded holes in the bosses $i\ i'$ of said recessed disk D, and holding said wheels and the clicks in place and allowing the geared ring to turn freely in the disk.

To the front plate $a'$ is fitted a cap E, in which is journaled a sleeve F, through which passes one end of a shaft F', the other end of the said shaft being journaled in the boss $l$ at the center of the rear plate $a$.

To the inner end of the sleeve F is attached a pinion $m$, which engages the spur-wheels $h\ h'$. Upon the sleeve F, between the pinion on the sleeve entering the center recess in the recessed disk D and cap E, is loosely placed a hub $n$, provided with a hook $o$, which projects into a hole in the inner end of a volute spring G. The outer end of the said volute spring G is attached to a drag-spring H, which fits tightly into the cap E, the said spring being provided with a stud $p$, which enters a hole in the outer end of the spring G.

The drag-spring H is wider than the spring G and serves to hold the outer end of the spring G under all circumstances when the reel is working normally; but when the said spring G is overwound it will cause the drag-spring H to slip, thereby preventing the breaking of the spring. The drag-spring is just strong enough to hold the driving-spring until fully coiled. The hub $n$ of the spring G is provided with two lugs $q$ arranged on diametrically-opposite sides of the hub, which enter corresponding recesses in the plate $j$.

Upon studs $r$ $r'$ in recesses $s$ $s'$ of the disk D are placed pawls $t$ $t'$, which engage the cogs of the ring C, the said pawls being provided with springs $u$ $u'$, arranged to hold the said pawls in engagement with the cogs of the ring C. In the ring C are inserted studs $a^2$ $a^3$, which project from the inner face of the said ring at diametrically-opposite points, and upon the said studs are placed pinions $b'$ $b^2$, which engage the cogs $c$ on the inner surface of the ring B, and to the said pinions $b'$ $b^2$ are attached the spur-wheels $c'$ $c^2$, which engage a pinion $d'$, placed loosely on the shaft $F'$. The said pinion $d'$ has a wide face, and is provided on its inner side with pointed teeth $e'$.

To the inner face of the recessed disk D is secured a crown-wheel $f'$, whose teeth correspond in number with those of the pinion $d'$, or a section of a crown-wheel, or pins inserted in the disk to serve as a lock when the pinion is disengaged from the reel. Between the pinion $d'$ and the crown-wheel $f'$ is placed a spiral spring $j'$, which surrounds the shaft $F'$ and exerts a pressure upon the pinion $d'$.

The shaft $F'$ is provided with a collar having teeth $m'$, which are truncated, the said truncated teeth being adapted for engagement with the teeth $e'$. Upon the shaft $F'$ is loosely placed the reel J, which is provided with concave heads $a^4$ $a^5$. The head $a^4$ incloses the spur-wheels $c'$ $c^2$ and the pinion $d'$ and the head $a^5$ incloses the brake mechanism and the drag mechanism, presently to be described. Upon the end of the reel J adjoining the pinion $d'$ there is a rim $b^4$, which is provided with internal teeth corresponding with the teeth of the said pinion $d'$. When the said pinion $d'$ is pushed inward by the spring $j'$, it engages the internal teeth of the rim $b^4$ when it is in position to carry the reel J; but when the pinion $d'$ is pushed outward by the engagement of the inclined teeth $m'$ with the inclined teeth $e'$ the pinion $d'$ is moved out of engagement with the teeth of the rim $b^4$, its other end engaging the crown-wheel or pins on the disk and locking the driving mechanism, and the reel J is free to turn independently of the pinion $d'$. Upon the end of the shaft $F'$, which projects through the plate $a'$, is placed a milled head $i^3$ or plate with projections, by which the said shaft $F'$ may be turned when it is desired to bring the teeth $m'$ into engagement with the teeth $e'$ in the operation of disengaging the pinion $d'$ from the toothed rim $b^4$.

Upon the boss of the reel J, within the concave head $a^5$, is formed a spur-wheel K, and in a slot $c^5$ in the back plate $a$ is placed a stud having upon the inner face of the said plate a head $c^6$ and upon the outer face of the plate a head $c^7$. (Shown in dotted lines.) To the head $c^6$ is attached a diamond-shaped click $d^5$, which is widest at the center and tapers from the central point in both directions. A circular spring $e^5$ surrounds the spur-wheel K, and is held in place by the click $e^6$. The ends of the circular spring $e^5$ bear upon opposite sides of the click $d^5$ and serve to hold the said click in or out of engagement with the spur-wheel K. The spring also serves to hold the click in engagement with the teeth of the said spur-wheel, when the wheel is turned and the click pushed in. This device serves to give an alarm when the reel begins to revolve, and also to prevent the reel from making an undue number of revolutions under a sudden impulse.

The concave head $a^5$ of the reel J is provided with the brake-rim L, and to the plate $a$, within the said brake-rim, is secured a clip $h^4$, which embraces the center of a C-shaped brake-spring M, adapted to bear at diametrically-opposite points upon the inner face of the brake-rim L. In an annular recess in the plate $a$ is journaled a ring $j^4$, which carries two beveled cam-lugs $l^4$ $l^5$, which are adapted to engage the ends of the C-shaped brake-spring M and to spread the spring so as to cause it to bear upon the inner face of the brake-rim L when the ring $j^4$ is turned.

The plates $a$ $a'$ are attached to round pillars or bars on the rod-plate O by means of screws $o^4$ $o^5$. The pillar, into which enter the screws $o^4$, forms the pivot of the forked brake-lever $p^4$. The ring $j^4$ is connected with the forked lever $p^4$ by the link $q^4$, and the free extremity of the said forked lever $p^4$ is provided with a ring or loop $r^4$ for receiving the finger. The bar O is secured to the fishing-rod in the usual way by means of rings $s^4$, as shown in Fig. 1. The shaft $F'$ is squared at its outer end and provided with a hand-crank $t^4$, by which it may be turned.

The operation of my improved reel is as follows: By turning the shaft $F'$ by means of the crank $t^4$ the pinion $m$ is made to turn the spur-wheels $h$ $h'$, and these, by engagement with the internal teeth $e$ of the ring C, tend to carry the recessed disk D and the hub $n$, thus tending to wind the spring G; but the ring C carries the pinions $b'$ $b^2$, which engage the cogs $c$ on the interior of the ring B, and the said pinions $b'$ $b^2$, through the medium of the spur-wheels $c'$ $c^2$, attached to the said pinions, tend to move the pinion $d'$ and the reel J in the direction indicated by the arrow in Fig. 3. It will thus be seen that the power is applied to the system between the spring G and the reel J, and that while turning the crank $t^4$, if the resistance of the reel is greater than that of the spring G, the spring will be wound until its resistance equals that of the reel, when the reel will be turned, and if, on the other hand, the resistance of the spring is greater than that of the reel, the spring forms an abutment for the system of gearing, and the reel revolves. The operation of winding the spring and of revolving the reel may continue simultaneously, or the spring may be wound and the reel may be operated by the power stored in the spring. In either case a continual tension will be maintained upon the line wound on the reel J, so that a fish when engaged by the hook attached to the line is opposed in all his movements by a taut line, the tension of the line being governed by the power of the spring G alone or by the spring or the brake, or by both together, in combination with the click $d^5$; or the power may be increased by a backward pressure on the crank, acting through the pinion, the winding-wheels, and click $d^5$. When it is desired to disengage the reel J from the propelling mechanism, so that the line may be paid out freely, the milled head $i^3$ is turned, thus turning the shaft F', thereby bringing the inclined faces of the teeth $m'$ into engagement with the inclined faces of the teeth $e'$, forcing the pinion $d'$ out of engagement with the toothed rim $b^4$, when the reel will turn freely. Its motion may then be controlled by the brake-spring M, which is expanded by means of the ring $j^4$, which is turned by the lever $p^4$ through the medium of the link $j^4$, the cams $l^4 l^5$ on the ring $j^4$ engaging the ends of the spring M, as already described. It may also be retarded by the click $d^5$, which not only prevents too much of the line from being paid out, but gives warning of the taking of the hook by a fish, when the reel may be brought under control by means of the brake already described or by turning the milled head $i^3$ so as to disengage the teeth $e'$ from the summits of the teeth $m'$ and permit the spring $j'$ to push the pinion $d'$ forward into a re-engagement with the toothed rim $b^4$, thus bringing the reel into connection with the gearing, when the paying out of the line will be against the power of the spring G, and this power may be varied by turning the crank $t^4$ more or less. In this manner the tension of the spring may be adjusted to the power of the fish upon the line, so that the reel will take in or pay out the line, as may be required, while maintaining sufficient tension to prevent the escape of the fish. When it is desired to operate the reel with a positive motion, the milled head $i^3$ is turned and the crank $t^4$ is turned backward, when the pawls $t\ t'$ engage the teeth of the ring C and impart a positive motion to the said ring and to the gearing connected therewith.

Although I have described my invention in connection with a fishing-reel, I do not limit or confine myself to this particular use, as it may be applied to drive any kind of machinery where a yielding or variable system of gearing is required between the prime motor and the driven machinery—for example, in operating bicycles or tricycles, in hoisting apparatus, in casting a ship's lead, and in converting the unsteady power of a windmill or other motor into uniform motive power.

Having thus described my invention, I claim as new and desire to secure by Letters Patent—

1. In a fishing-reel, the combination of the shaft F', the reel J, loosely mounted on the shaft, the sleeve F on the shaft outside of the reel, the pinion $m$ on the inner end of the sleeve, a handle on the outer end of the sleeve, a spring, and gearing between the spring and reel and operated by the pinion of the sleeve, substantially as described.

2. In a fishing-reel, the combination of the spring-pressed driving-pinion $d'$, provided with the beveled teeth $e'$, the shaft F', a collar fixed to the shaft F' and provided with beveled teeth $m'$, and the milled head $i^3$, secured to the shaft F', substantially as specified.

3. In a fishing-reel, the combination, with the shaft F', provided with a toothed collar $m'$, and the reel J mounted loosely thereon, of the sleeve F on the shaft outside of the reel, the pinion $m$ on the inner end of the sleeve, a spring-actuated train of gearing operated by the said pinion, the spring-pressed pinion $d'$, provided with teeth engaging the teeth of the collar $m'$, and the head $i^3$ on the end of the shaft opposite the sleeve, substantially as described.

4. In a fishing-reel, the combination, with the reel J, provided with the brake-rim L, of the C-shaped spring M, the ring $j^4$, provided with the cam-lugs $l^4 l^5$, and means, substantially as described, for moving the ring $j^4$.

ELBERT B. PORTER.

Witnesses:
CHAS. ELMENDORF,
F. TOMPKINS.